United States Patent
Balan et al.

(10) Patent No.: US 12,425,277 B2
(45) Date of Patent: Sep. 23, 2025

(54) DECISION FEED FORWARD EQUALIZATION FOR PARTIAL RESPONSE EQUALIZED SIGNAL INCLUDING PRE-CURSOR CANCELATION

(71) Applicant: NVIDIA Corporation, Santa Clara, CA (US)

(72) Inventors: Vishnu Balan, Saratoga, CA (US); Viswanath Annampedu, Plano, TX (US); Pervez Mirzra Aziz, Dallas, TX (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/745,229

(22) Filed: Jun. 17, 2024

(65) Prior Publication Data

US 2024/0340201 A1    Oct. 10, 2024

Related U.S. Application Data

(63) Continuation of application No. 18/112,401, filed on Feb. 21, 2023, now Pat. No. 12,057,974, which is a continuation of application No. 17/392,178, filed on Aug. 2, 2021, now Pat. No. 11,611,458.

(51) Int. Cl.
*H04L 25/03*       (2006.01)
(52) U.S. Cl.
CPC .............. *H04L 25/03057* (2013.01)
(58) Field of Classification Search
CPC ............................................. H04L 25/03057
See application file for complete search history.

(56) References Cited

U.S. PATENT DOCUMENTS

| | | | |
|---|---|---|---|
| 6,693,958 B1 | 2/2004 | Wang et al. | |
| 8,787,439 B2 | 7/2014 | Palusa et al. | |
| 9,077,574 B1 | 7/2015 | Healey et al. | |
| 11,212,143 B1 | 12/2021 | Bailey et al. | |
| 2010/0135378 A1* | 6/2010 | Lin | H04L 7/0058 |
| | | | 375/232 |
| 2013/0243066 A1* | 9/2013 | Palusa | H04L 25/03057 |
| | | | 375/232 |

(Continued)

OTHER PUBLICATIONS

Pola A.L., et al., "A New Low Complexity Iterative Equalization Architecture for High-speed Receivers on Highly Dispersive Channels: Decision Feedforward Equalizer (DFFE)," IEEE International Symposium of Circuits and Systems (ISCAS), May 15, 2011, 4 Pages.

(Continued)

*Primary Examiner* — Janice N Tieu
(74) *Attorney, Agent, or Firm* — Lowenstein Sandler LLP

(57) ABSTRACT

A receiver includes a partial response (PR) system that receives a received signal from a transmitter over a channel and equalize the received signal such that there is a controlled relationship between consecutive values of equalized received symbols and transmitted data transmitted by the transmitter. The receiver also includes a decision feed forward equalization (DFFE) system that receives partial response signals from the PR system and cancel at least one of pre-cursor intersymbol interference (ISI) or post-cursor ISI introduced by the channel.

20 Claims, 10 Drawing Sheets

(56) References Cited

U.S. PATENT DOCUMENTS

2021/0044462 A1* 2/2021 Lu .................. H04L 25/061
2022/0360476 A1* 11/2022 Palusa .............. H04L 27/01

OTHER PUBLICATIONS

Pola A.L., et al., "Efficient Decision Feedforward Equalizer with Parallelizable Architecture," In 2013 IEEE International Symposium on Circuits and Systems (ISCAS), May 19, 2013, pp. 2771-2777.

* cited by examiner

DECISION FEED FORWARD EQUALIZATION FOR PARTIAL RESPONSE EQUALIZED SIGNAL INCLUDING PRE-CURSOR CANCELATION

RELATED APPLICATION

This application is a continuation application of U.S. patent application Ser. No. 18/112,401, filed on Feb. 21, 2023, which is a continuation application of U.S. patent application Ser. No. 17/392,178, filed on Aug. 2, 2021, now U.S. Pat. No. 11,611,458, the entire contents of which are hereby incorporated by reference herein.

TECHNICAL FIELD

At least one embodiment pertains to processing resources used for equalizers to mitigate intersymbol interference introduced by a communication channel. For example, at least one embodiment pertains to technology for decision feed forward equalization for partial response equalized signal including pre-cursor cancelation.

BACKGROUND

Network devices, including those that employ serializer/deserializer (SerDes) technology, use techniques to mitigate high intersymbol interference (ISI) from highly dispersive and reflective channels, such as Maximum Likelihood Sequence Detection (MLSD) and Decision Feedback Equalization (DFE). The problem with MLSD is that its complexity grows exponentially with channel memory. On the other hand, the complexity of DFE grows linearly with channel memory. However, the bottleneck created by the decision feedback loop of DFE requires parallel architectures, such as loop unrolling, which again grows exponentially with the number of unrolled taps.

BRIEF DESCRIPTION OF DRAWINGS

Various embodiments in accordance with the present disclosure will be described with reference to the drawings, in which.

DETAILED DESCRIPTION

Figure 1A:
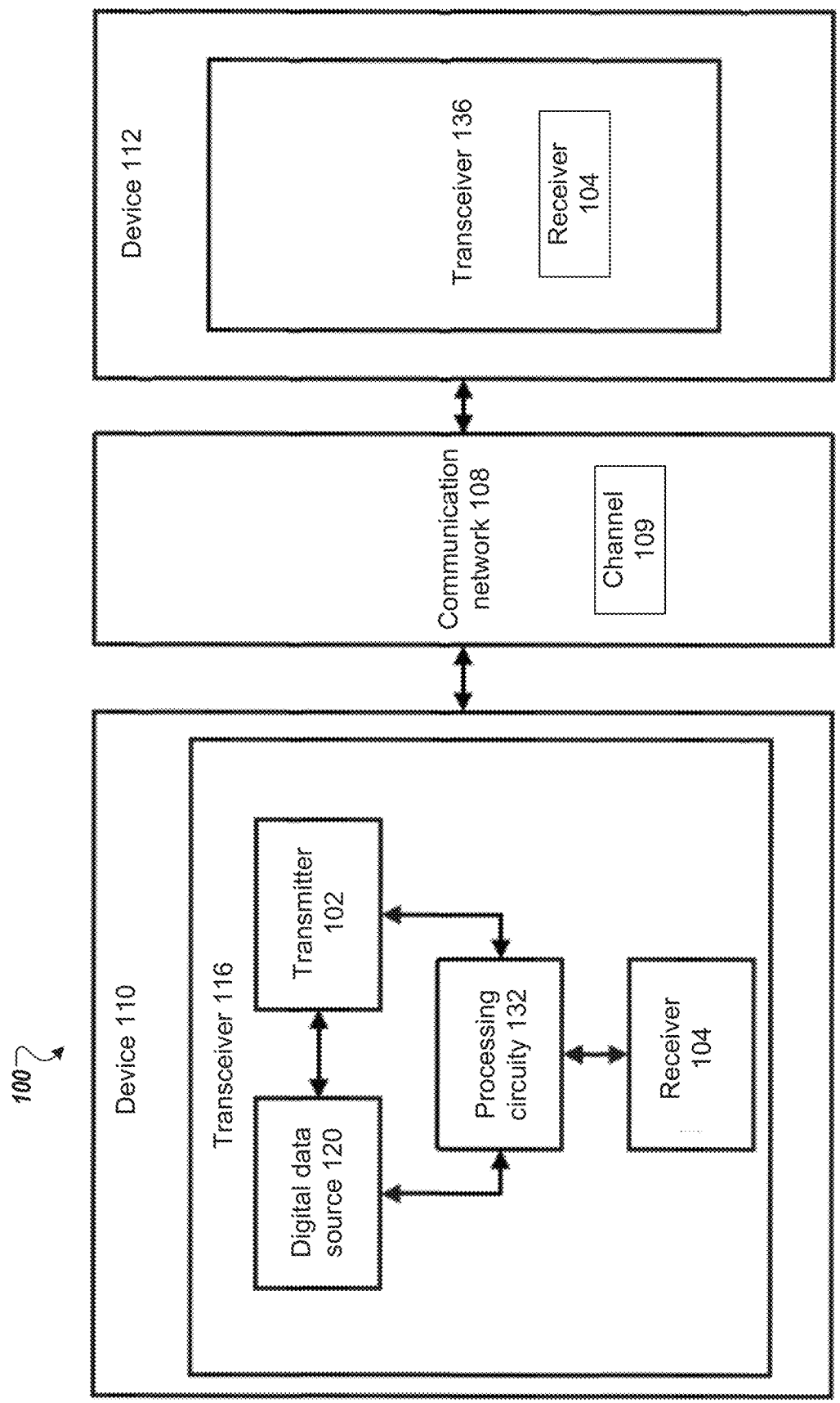
FIG. 1A illustrates an example communication system, in accordance with at least some embodiments.

Technologies for decision feed forward equalization (DFFE) for partial response equalized signals including pre-cursor cancelation are described. As described above, techniques like MLSD and DFE grow exponentially in complexity with channel memory or parallel architectures for loop unrolling.

Another technique for iterative interference cancelation techniques is called DFFE. DFFE reduces the complexity for high-speed receivers, but prior DFFE solutions cannot be applied to non-partial response systems, and prior DFFE solutions cannot handle pre-cursor cancelation. A partial response system equalizes the received signal such that there is a carefully controlled and apriori determined relationship between consecutive values of equalized received symbols and the transmitted data.

Aspects and embodiments of the present disclosure address these and other challenges by applying DFFE to a partial response system with an ability to cancel both pre-cursor and post-cursor ISI. Aspects and embodiments of the present disclosure can be done to apply DFFE on partial response signals as the ISI is originally introduced by the communication channel on the transmitted data at the channel output prior to partial response equalization. For example, in a partial response system (pulse amplitude modulation 4-level (PAM4) PR1 (duobinary)), the transmitted symbols of −3, −1, 1, 3, will take on values of −6, −4, −2, 0, 2, 4, 6 after a [1+D] PR1 equalization at the DFFE input. As the ISI that needs to be canceled is introduced on transmitted data symbols by a communication channel, the partial response symbol estimates (7 levels) need to be inverted to the transmitted PAM4 symbol estimates (4 levels) prior to calculating the amount of ISI that needs to be canceled from the receiver feed forward equalization samples (rxFFE samples) after proper delays. The embodiments described herein use a partial response inverter (PR1 inverter) inside the DFFE to work with a partial response system.

Aspects and embodiments of the present disclosure are performed for pre-cursor cancelation using the iterative DFFE scheme described herein. Pre-cursor processing requires looking ahead at samples in time, which is not possible in a causal system. To maintain causality, the delayed input samples y(n) are used. To do a full pre-cursor cancelation in each DFFE stage, the product of the number of pre-cursors and the number of DFFE stages worth of additional samples need to be processed in a digital clock cycle. To reduce circuit complexity while not losing much performance, the aspects and embodiments of the present disclosure address these and other challenges by re-using the same estimates from a first stage to subsequent DFFE stages.

Aspects and embodiments of the present disclosure are applicable to any data recovery scheme in a communication system employing partial response equalized receivers. The communication channel can be over serial links (e.g., a cable, printed circuit boards (PCBs) traces, copper cables, optical fibers, or the like), read channels for data storage (e.g., hard disk, flash solid-state drives (SSDs), high-speed serial links, deep space satellite communication channels, applications, or the like. In at least one embodiment, programmable control options can be provided that allow a user to choose a quantity and positions of pre-cursor and post-cursor locations to be canceled. Aspects and embodiments of the present disclosure can achieve reduced symbol error rates and better eye opening margins from better-equalized samples when this feature is used, even when the channel is highly reflective with significant reflection ISI.

FIG. 1A illustrates an example communication system 100 according to at least one example embodiment. The system 100 includes a device 110, a communication network 108 including a communication channel 109, and a device 112. In at least one example embodiment, devices 104 and 112 correspond to one or more of a Personal Computer (PC), a laptop, a tablet, a smartphone, a server, a collection of servers, or the like. In some embodiments, the devices 104 and 112 may correspond to any appropriate type of device that communicates with other devices also connected to a common type of communication network 108. According to embodiments, the receiver 104 of devices 110 or 112 may correspond to a graphics processing unit (GPU), a switch (e.g., a high-speed network switch), a network adapter, a central processing unit (CPU), etc. As another specific but non-limiting example, the devices 104 and 112 may correspond to servers offering information resources, services and/or applications to user devices, client devices, or other hosts in the system 100.

Examples of the communication network 108 that may be used to connect the devices 104 and 112 include an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. In one specific, but non-limiting example, the communication network 108 is a network that enables data transmission between the devices 104 and 112 using data signals (e.g., digital, optical, wireless signals).

The device 104 includes a transceiver 116 for sending and receiving signals, for example, data signals. The data signals may be digital or optical signals modulated with data or other suitable signal for carrying data.

The transceiver 116 may include a digital data source 120, a transmitter 102, a receiver 104, and processing circuitry 132 that controls the transceiver 116. The digital data generator 120 may include suitable hardware and/or software for outputting data in a digital format (e.g., in binary code and/or thermometer code). The digital data output by the digital data source 120 may be retrieved from memory (not illustrated) or generated according to input (e.g., user input).

The transmitter 124 includes suitable software and/or hardware for receiving digital data from the digital data source 120 and outputting data signals according to the digital data for transmission over the communication network 108 to a receiver 104 of device 112. Additional details of the structure of the transmitter 124 are discussed in more detail below with reference to the figures.

The receiver 104 of device 110 and device 112 may include suitable hardware and/or software for receiving signals, for example, data signals from the communication network 108. For example, the receiver 104 may include components for receiving processing signals to extract the data for storing in a memory, as described in detail below with respect to FIG. 1B-FIG. 9.

The processing circuitry 132 may comprise software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132 may comprise hardware, such as an application specific integrated circuit (ASIC). Other non-limiting examples of the processing circuitry 132 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control overall operation of the transceiver 116.

The transceiver 116 or selected elements of the transceiver 116 may take the form of a pluggable card or controller for the device 110. For example, the transceiver 116 or selected elements of the transceiver 116 may be implemented on a network interface card (NIC).

The device 112 may include a transceiver 136 for sending and receiving signals, for example, data signals over a channel 109 of the communication network 108. The same or similar structure of the transceiver 116 may be applied to transceiver 136, and thus, the structure of transceiver 136 is not described separately.

Although not explicitly shown, it should be appreciated that devices 110 and 112 and the transceivers 116 and 120 may include other processing devices, storage devices, and/or communication interfaces generally associated with computing tasks, such as sending and receiving data.

Figure 1B:
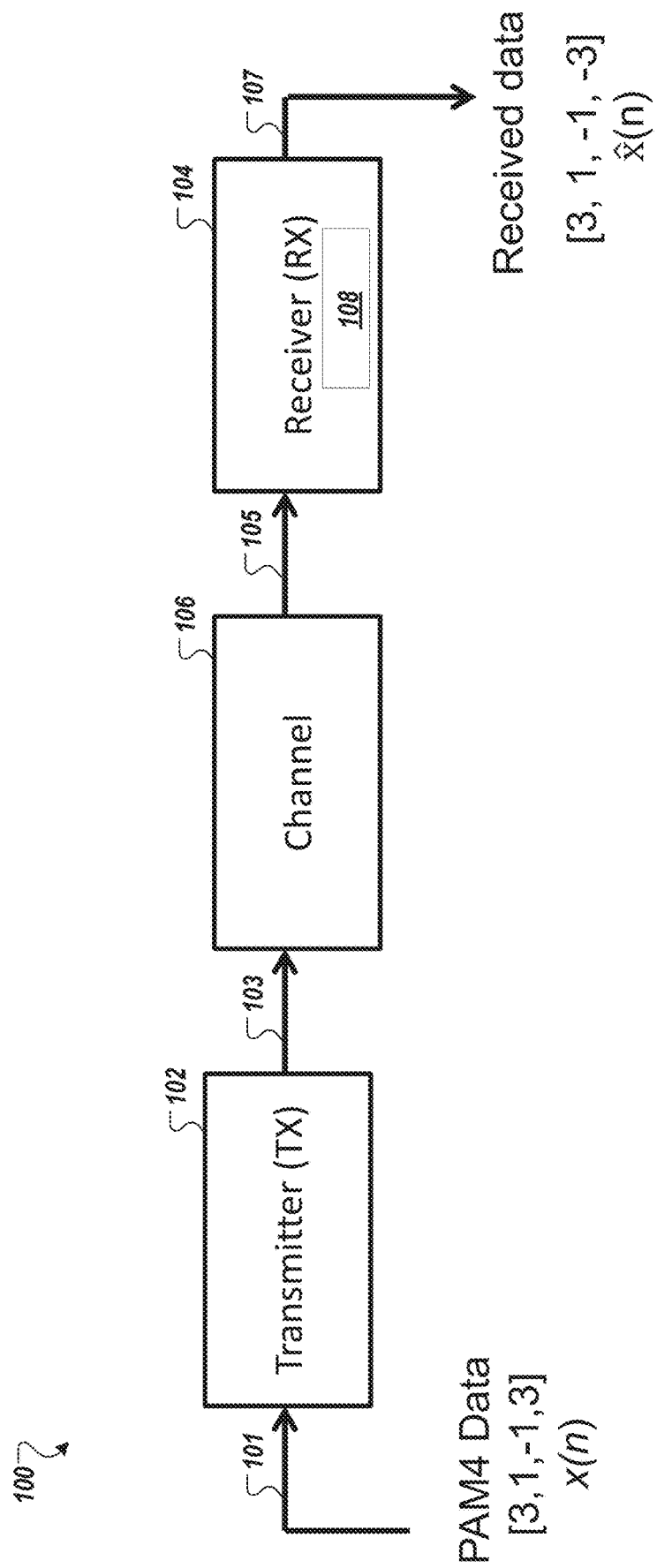
FIG. 1B is a circuit diagram of a communication system with a transmitter (TX), a transmission medium or channel, and a receiver (RX) with decision feed forward equalization (DFFE) circuitry for partial response equalized signals and pre-cursor cancelation, according to at least one embodiment.

FIG. 1B is a circuit diagram of a communication system 100 with a transmitter (TX) 102, a communication channel 106 (e.g., a transmission medium), and a receiver (RX) 104 with DFFE circuitry 108 for partial response equalized signals and pre-cursor cancelation, according to at least one embodiment. The communication channel 106 (e.g., a cable, printed circuit board, optical fibers, etc.) is a destructive medium in that the channel acts as a low pass filter which attenuates higher frequencies more than it attenuates lower frequencies and introduces inter-symbol interference (ISI). In particular, the transmitter 102 transmits digitally encoded data 103 through the communication channel 106, which introduces ISI to the transmitted data 103 at the channel output. In at least one embodiment, the communication system 100 is a non-return to zero (NRZ) based system. For a non-return to zero (NRZ) based system, the transmitted data symbols consist of symbols −1 and 1, with each symbol value representing a binary bit. This is also known as a pulse amplitude modulation 2-level (PAM2) system as there are 2 unique values of transmitted symbols. Typically a binary bit 0 is encoded as −1, and a bit 1 is encoded as 1 as the PAM2 values. In at least one embodiment, the communication system 100 is a PAM4 based system that uses 4 unique values of transmitted symbols to achieve higher efficiency and performance. These 4 levels are typically denoted by symbol values of −3, −1, 1, 3, with each symbol representing a corresponding unique combination of 2 binary bits (e.g., 00, 01, 10, 11). As illustrated in FIG. 1B, the transmitter 102 receives input data 101, including PAM4 modulated data (e.g., $x(n)$), and transmits the input data 101 as digitally encoded data 103.

In at least one embodiment, the communication channel 106 can include one or more serial links, such as PCB traces, copper cables, or the like. In at least one embodiment, the communication channel 106 include read channels, such as used in hard disk drives, solid-state drives, or other input-output devices.

As described above, the communication channel 106 introduces ISI to the transmitted data 103 at the channel output 105. Once the transmitted data 103 passes through the communication channel 106, the receiver 104 processes the channel output 105 using an equalizer as the channel output 105 includes pre-cursor ISI and post-cursor ISI introduced by the communication channel 106. Equalizers in the receiver 104 are used to mitigate the effects of ISI. Examples of equalizers are continuous-time linear equalizer (CTLE), sampled data finite impulse response (FIR) filter, also known as an RX feed forward equalization (RXFFE), decision feed forward equalization (DFFE), or decision feedback equalization (DFE). One or more of these equalizers may be optionally used in the communication system 100. In at least one embodiment, the equalizer in the receiver 104 can mitigate the effects of ISI by sampling the channel output 105 at desirable time instances to properly detect the received data such that the recovered data is error-free.

In at least one embodiment, the receiver 104 receives a received signal and converts the received signal into a set of detected symbol values. The receiver 104 can include a feed forward equalization component (FFE or RXFFE or RX FFE) that generates a detected signal that is equalized to a partial response. The feed forward equalization component is a circuit configured as a transversal filter to compensate for frequency-dependent loss caused by the communication channel 106. The feed forward equalization component can compensate for the loss or noise introduced by the communication channel 106 by performing equalization to recover the transmitted data and establish the received data (i.e., the received data at time n is represented as "$x(n)$"). The equalization enables the feed forward equalization component to generate an output of an equalized received signal (the detected signal), including a set of estimated symbol values at time n as $y(n)$. In the example, the feed forward equalization component equalizes the received signal to generate received symbols. For PAM4 transmitted symbols of −3, −1, 1, 3 in a partial response system, the partial response symbols $y(n)$ take on values of −6, −4, −2, 0, 2, 4, 6.

In at least one embodiment, the receiver 104 includes DFFE circuitry 108 for partial response equalized signals and pre-cursor cancelation. In at least one embodiment, the DFFE circuitry 108 includes a partial response (PR) inverter and a decision feed forward equalization (DFFE) component. The PR inverter generates a set of estimated transmitted symbol values based on the set of detected symbol values. The DFFE circuitry applies DFFE to the set of estimated transmitted symbols to cancel the pre-cursor ISI and the post-cursor ISI to obtain a compensated signal and a set of compensated symbol values. The DFFE circuitry to cancel the pre-cursor ISI and the post-cursor ISI from the detected signal uses the set of estimated transmitted symbols values and a set of tap coefficients to obtain a compensated signal and a set of compensated symbol values. The DFFE circuitry outputs received data 107 (e.g., $x(n)$), which represents the set of estimated transmitted symbol values in which the pre-cursor ISI and post-cursor ISI is canceled.

In at least one embodiment, the receiver 104 with the DFFE circuitry 108 can apply DFFE to a partial response signal with the ability to cancel both pre-cursor and post-cursor ISI as the ISI is originally introduced by the communication channel 106 on the transmitted data at the channel output prior to partial response equalization. As the ISI that needs to be canceled is introduced on transmitted data symbols by the communication channel 106, the partial response symbol estimates (7 levels) need to be inverted to the transmitted PAM4 symbol estimates (4 levels) prior to calculating the amount of ISI that needs to be canceled from the receiver FFE samples (rxFFE samples) after proper delays. In at least one embodiment, the DFFE circuitry 108 (or the receiver 104) uses a partial response inverter (PRI inverter) to operate with a partial response system. In other embodiments, the DFFE circuitry 108 can be used in any data recovery scheme in which partial response equalizers are used. The DFFE circuitry 108 can reduce symbol error rates and improve eye opening margins from better-equalized samples, even when the communication channel 106 is highly reflective and causes significant reflection ISI.

In at least one embodiment, the receiver 104 can provide programmable control options to a user. The programmable control operations can allow the user to choose a number and position of pre-cursor and post-cursor locations to be canceled by the DFFE circuitry 108, such as illustrated in a sampled pulse response of FIG. 2.

Figure 2:
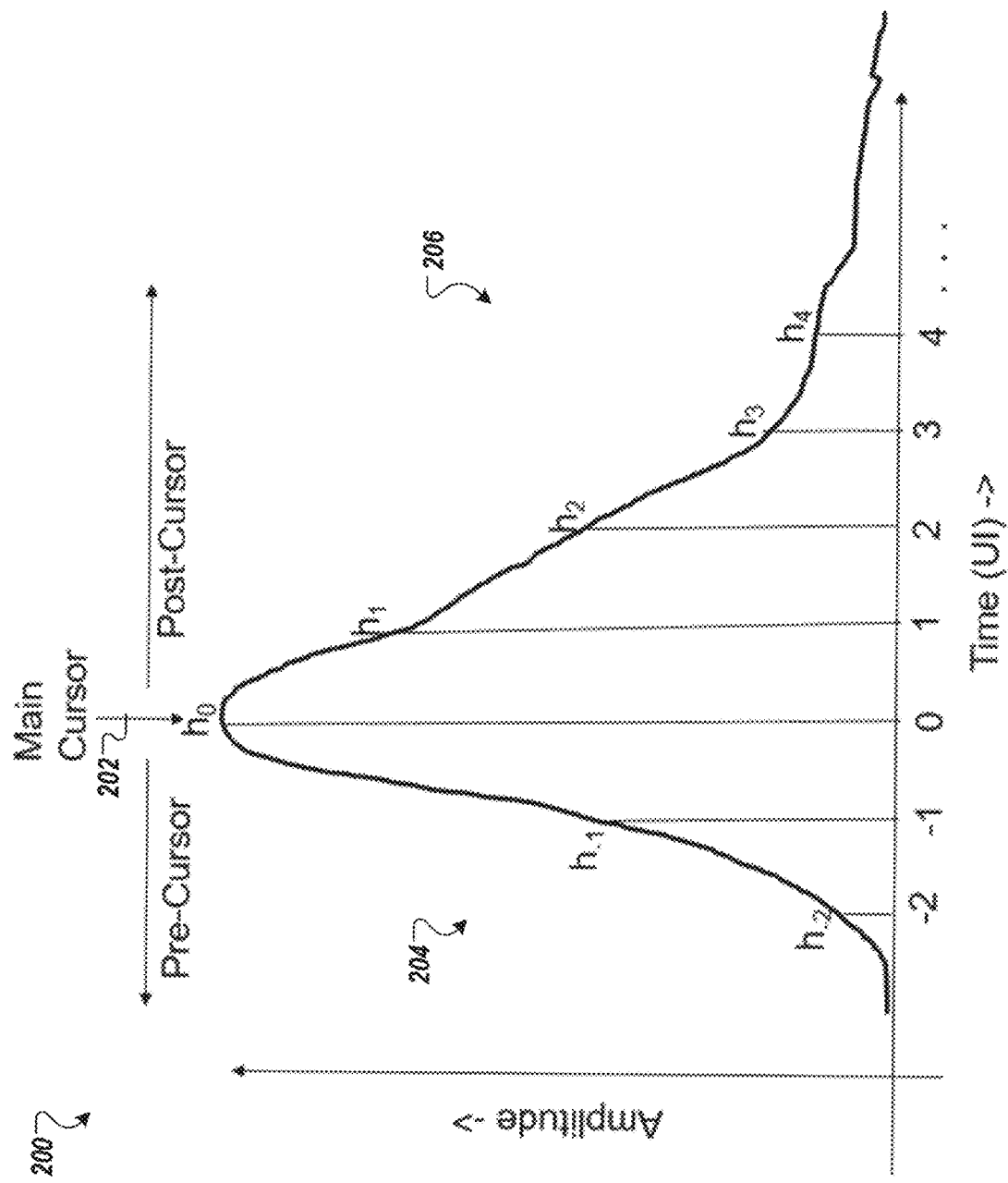
FIG. 2 illustrates a sampled pulse response of a communication channel, according to at least one embodiment.

FIG. 2 illustrates a sampled pulse response 200 of a communication channel, according to at least one embodiment. The sampled pulse response 200 has a main cursor tap 202, denoted by $h_0$, a set of pre-cursor taps 204, denoted by . . . $h_{-2}$, $h_{-1}$, and a set of post-cursor taps 206, denoted by $h_1$, $h_2$, $h_3$, $h_4$, . . . . Although the sampled pulse response 200 shows two pre-cursor taps 204 and four post-cursor taps 206, in other embodiments, the sampled pulse response can have P number of pre-cursor taps 204 and M number of post-cursor taps 206, where P and M are positive integers.

The values of these cursors are typically estimated through adaptive loop filters. A typical RXFFE mitigates both pre-cursor and post-cursor ISI by minimizing the error between RXFFE input samples and output samples based on some metric such as minimizing the mean squared error. Although RXFFE can handle both pre- and post-cursor ISI, it will enhance the quantization noise of the analog-to-digital conversion process in a typical mixed-signal system. A classical DFE cancels only the post-cursor ISI. Unlike RXFFE, a DFE does not enhance quantization noise as it attempts to cancel the post-cursor ISI at those specific sampling instances. But, because of feedback, any detection error could propagate, especially if the post-cursor ISI is larger in magnitude. It is not uncommon to employ both RXFFE and DFE in a system to get a balanced performance. As described below with respect to FIGS. 3-8, the receiver can include an RXFFE and DFFE circuitry 108 for partial response equalized signals and pre-cursor cancelation.

Figure 3:
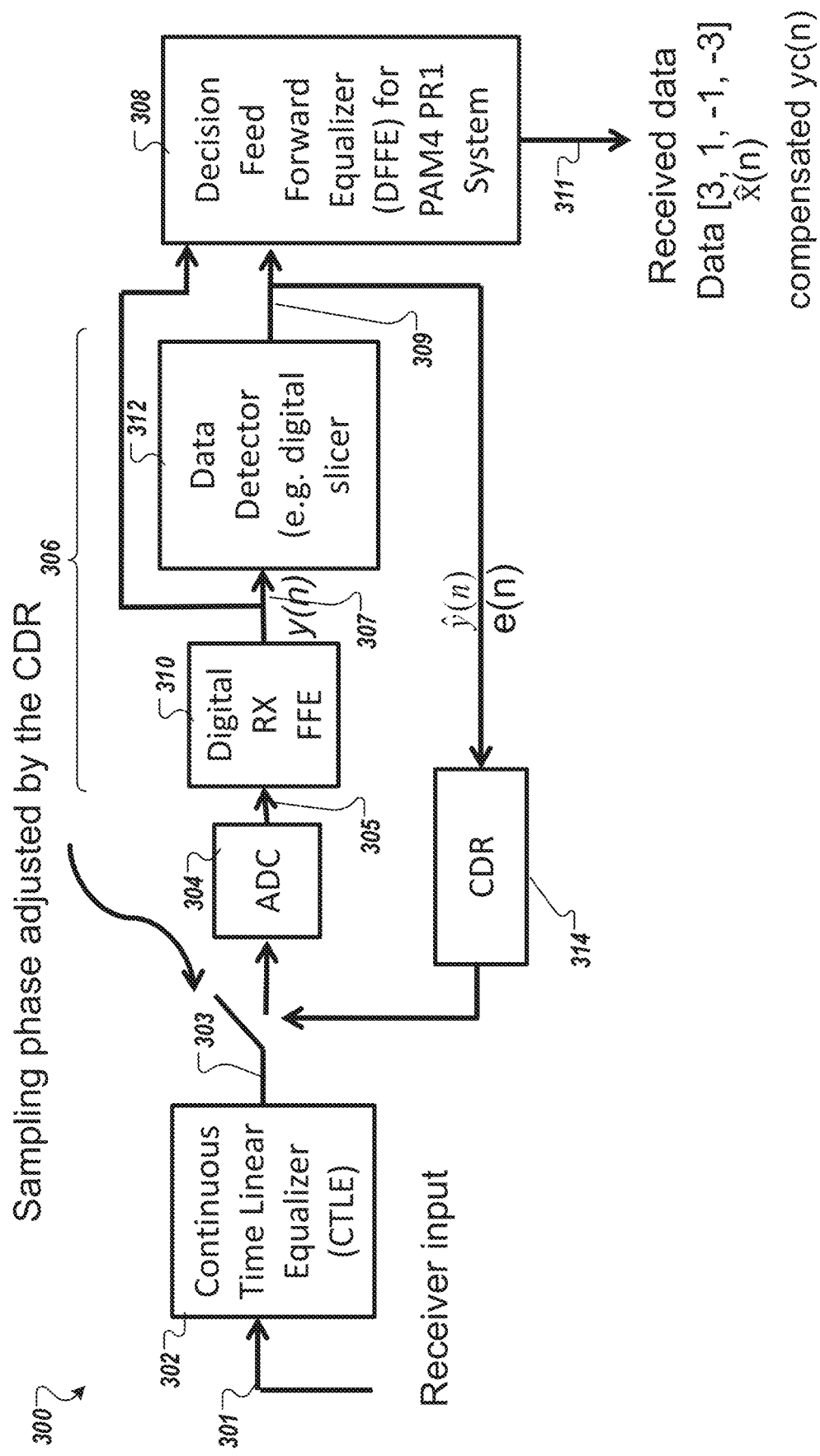
FIG. 3 is a block diagram of a receiver with partial response equalization and digital feed forward equalization, according to at least one embodiment.

FIG. 3 is a block diagram of a receiver 300 with partial response equalization and digital feed forward equalization, according to at least one embodiment. The receiver 300 includes DFFE circuitry 308. DFFE circuitry 308 is similar to DFFE circuitry 108, except the DFFE circuitry 308 is used for a partial response (PR) system (e.g., PAM4 PR1 system). The receiver 300 includes a continuous-time linear equalizer (CTLE) 302 that receives an analog signal 301 from a communication channel (not illustrated in FIG. 3). The CTLE 302 is a linear filter that can attenuate low-frequency signal components and high-frequency signal components and amplify signal components in the desired frequency range. In other embodiments, the receiver 300 includes other filters or equalizers, such as a sampled data finite impulse response (FIR) filter. The CTLE 302 can be configured to perform an initial equalization of the received signal (i.e., the receiver input), such as, for example, frequency equalization, gain adjustment, etc. According to embodiments, the CTLE is a linear filter applied at the receiver 300 that attenuates low-frequency signal components, amplifies components around the Nyquist frequency, and filters off higher frequencies. A CTLE gain can be adjusted to optimize the ratio of low-frequency attenuation to high-frequency amplification.

In at least one embodiment, the receiver 300 is a digital signal processing (DSP) based receiver, which includes an analog-to-digital converter (ADC) 304 to digitize or quantize a received signal 303 with relatively fine granularity and performs digital signal processing operations on the quantized or digital signal 305. The receiver 300 includes a PR receiver 306, including a digital RXFFE component 310 and data detector 312. In at least one embodiment, the data detector 312 is a digital slicer. In at least one embodiment, the data detector 312 is configured to perform detection on the signal to recover the actual data that was transmitted. In an embodiment, the data detector 312 is configured to produce detected data bits or symbols (represented as $\hat{y}(n)$ at time n). In one example, the data detector 312 performs a slicing operation to convert a value like, y(n)=6.1, to a decision estimate $\hat{y}(n)$=6, thereby reflecting a filtered or equalized version of the equalized input signal. For example, the data detector 312 can include one or more latches which "slice" a voltage at a programmable threshold or an ADC, which produces a multi-bit output from which the data can be detected and from which an estimate of the error (i.e., estimated error at time n is represented e(n)). For example, for a received symbol y(n)=6.1 and a decision estimate $\hat{y}(n)$=6.0, the error estimate e(n)=0.1. In this example, the data detector 312 converts the noisy received data (equalized data) into discrete detected data (e.g., −6, −4, −2, 0, 2, 4, 6) and provides a metric of the noise or error level (i.e., e(n)). In another example, the data detector 312 can include a maximum likelihood sequence detector (also known as a Viterbi detector) which can be used in conjunction with a preceding ADC. In an embodiment, the output of the data detector 312 generates the decision estimates based on the impaired partial response symbols (i.e., y(n)+e(n)) to generate the estimated data symbol ($\hat{y}(n)$) and the estimated error component e(n). In an embodiment, the error (e(n)) is the difference between the received symbol (y(n)) and the decision estimate ($\hat{y}(n)$). As shown in FIG. 3, the $\hat{y}(n)$ and e(n) are fed back to the clock data recovery (CDR) 314 for use by the CDR engine 314 to change or adjust the sampling phase for the ADC 304.

In an embodiment, the data detector 312 further provides output 309 to the DFFE system 308 to map the $\hat{y}(n)$ value (e.g., 6.0 in the example above) to a received data value in accordance with the applicable modulation scheme. For example, for a PAM4-based modulation scheme, the DFFE system 308 maps the $\hat{y}(n)$ value (e.g., −6, −4, −2, 0, 2, 4, 6) to a corresponding receive data value (e.g., −3, −1, 1, 3).

In at least one embodiment, the PR receiver 306 equalizes the digital signal 305 such that there is a carefully controlled and apriori determined relationship between consecutive values of equalized received symbols (e.g., 309) and the transmitted data (e.g., 305). For example, in a duobinary or PR1 system, the nominal relationship (assuming no other impairments and perfect equalization) between the transmitted data and the received slicer outputs 309 is expressed in the following equation (1):

$$\hat{y}(n) = x(n) + x(n-1) \qquad \text{Eq(1)}$$

where $\hat{y}(n)$ is the output 309 of the data detector 312 at symbol time n and the x(n) and x(n−1) are the transmitted data bits 305 at symbol times n and n−1, respectively. As described in more detail below, the data detector output 309, $\hat{y}(n)$, is processed by the DFFE system 308, including inverting the partial response and applying DFFE to obtain a final received data estimate of the transmitted data, $\hat{x}(n)$ 311, which in the absence of impairments should match the digital signal 305, x(n). The data detector output 309, $\hat{y}(n)$, is feedback to CDR engine 314.

In an embodiment, an adaptive loop is established in which samples are taken using a sampling phase, adjusted by the CDR engine 314, and passed as an input to the ADC 304 to generate a digital signal (i.e., the digital signal at time n is represented as "x(n)") which is provided as an input to the digital RXFFE component 310 to perform further equalization in the digital domain. In an embodiment, the digital RXFFE component 310 generates an "equalized" output (i.e., represented as "y(n)"), which is provided as an input to the data detector 312. This equalized output is also referred to as the detected signal.

In at least one embodiment, the CDR engine 314 adjusts a sampling phase of the ADC 304 based on feedback from the PR receiver 306. For example, to adapt the CDR engine 314 and other adaptive filters and loops in a typical receiver, an estimate of the error, e(n), in the detected data can also be computed. More complex detectors such as a maximum likelihood sequence detector (also known as a Viterbi detector) may also be used in advanced receivers. In at least one embodiment, the data detector 312 generates, based on the detected signal, the set of detected symbol values and an error metric and provides a feedback signal to the CDR engine 314. The feedback signal includes the set of detected symbol values and the error metric. In at least one embodiment, the CDR engine 314 adjusts the sampling phase associated with the received signal based at least in part on the set of detected symbol values and the error metric.

In at least one embodiment, the receiver 300 uses the DFFE system 308 to cancel both pre-cursor ISI and post cursor ISI for a PAM4 PR1 partial response system. The decoder (partial response inverter) is captured inside the DFFE system 308 in this embodiment. The DFFE system 308 produces estimates of transmitted data and cleaned up (more ISI canceled) version of RXFFE output y (n) 307 for further processing by maximum likelihood sequence detector. In other embodiments, NRZ/PAM2 or other modulation schemes can be employed with the same architecture. Additional details of the DFFE system 308 are described below with respect to FIG. 4 after some background description of DFFE.

As described above, MLSD and DFE are techniques to mitigate the high ISI from highly reflective channels. The problem with MLSD is that its complexity grows exponentially with channel memory. On the other hand, the complexity of DFE grows linearly with channel memory. However, the bottleneck created by the decision feedback loop of DFE requires parallel architectures, such as loop unrolling, which again grows exponentially with the number of unrolled taps. For example, the sliced data symbols $\hat{x}(n)$ obtained after canceling the ISI from the input samples y(n), can be expressed in equation (2):

$$\hat{x}(n) = Q\left(y(n) - \sum_{j=1}^{N_h} h_j(n)\hat{x}(n-j)\right) \quad \text{Eq(2)}$$

where, $h_j(n)$ denotes the estimates of $N_h$ number of post-cursor ISI values at location j at time n. The slicer function is denoted by Q. The speed bottleneck created by the feedback loop of a DFE presents a big challenge for high-speed operation. The speed bottleneck is that the operation inside Q( ) function above must be completed within 1 unit time interval before the next sample y(n) comes in. This critical problem can be addressed by parallel architectures such as unrolled DFE, but complexity scales exponentially even for PAM2 and gets even worse for PAM4 and beyond as the number of taps to be unrolled increases. Let P be the number of analog clock cycles in a digital clock cycle. Then, even a one-tap unrolled DFE requires 2*1*P comparisons for a PAM2 system, 4*3*P comparisons for a PAM4 system, and 6*5*P comparisons for a PAM4+PR1 system.

Another iterative interference cancelation technique is DFFE. DFFE can achieve near DFE performance at reduced complexity. Traditionally, DFFE is applied on a non-partial response system to cancel the post-cursor interference only. The detected symbol provided by DFFE at any iteration, i, is given by equation (3):

$$\hat{x}_i(n) = Q\left(y(n) - \sum_{j=1}^{N_h} h_j(n)\hat{x}_{i-1}(n-j)\right) \quad \text{Eq(3)}$$

where 1<=i<R and R is the total number of iterations, and Q is the slicer function. $\hat{x}_i(n)$ refers to the sliced data symbol after ISI calculation at stage i. In this example, only post-cursors (including $h_1$) are used for ISI cancelation from the input, y(n). In this example, the same input is used for canceling ISI in all stages/iterations. Let $yc_i(n)$ denote the cleaned up DFFE input samples y (n) at stage i. $yc_i(n)$ is the argument of the Q function, as expressed in equation (4):

$$yc_i(n) = y(n) - \sum_{j=1}^{N_h} h_j(n)\hat{x}_{i-1}(n-j). \quad \text{Eq(4)}$$

Since all post cursors including $h_1$ are canceled, there is no known relationship between consecutive samples y(n) and hence such a system is not a partial response system. Also, a traditional DFFE does not provide pre-cursor ISI cancelation. The basic idea behind DFFE is the iterative use of tentative decisions to improve the accuracy of ISI estimation. Hence, the quality of tentative decisions and hence the compensation of ISI are expected to get better and better with each iteration/stage. Improved symbol estimates reduce the probability of erroneous corrections in the next stage and give better symbol estimates than the previous stage. DFFE (with enough iterations/stages) can potentially achieve the same level of performance as DFE with much less complexity. The number of DFFE stages required depends very heavily on the reliability of the initial tentative decisions passed on to the first DFFE stage. Techniques such as passing ADC samples using an RX feed forward equalization (RXFFE) to improve the quality of samples going into the DFFE are known to get better performance with fewer DFFE stages.

As described above, the DFFE system 308, however, can be applied to a partial response system and can enable DFFE to cancel not only the post cursor ISI, but also the pre-cursor ISI. The DFFE system 308 can also use simplified implementations and approximations that are trade-offs between pre-cursor cancelation performance and receiver complexity. The DFFE system 308 can be used with a non-partial response system, such as illustrated in FIG. 4, and with a partial response system, such as illustrated in FIG. 5.

Figure 4:
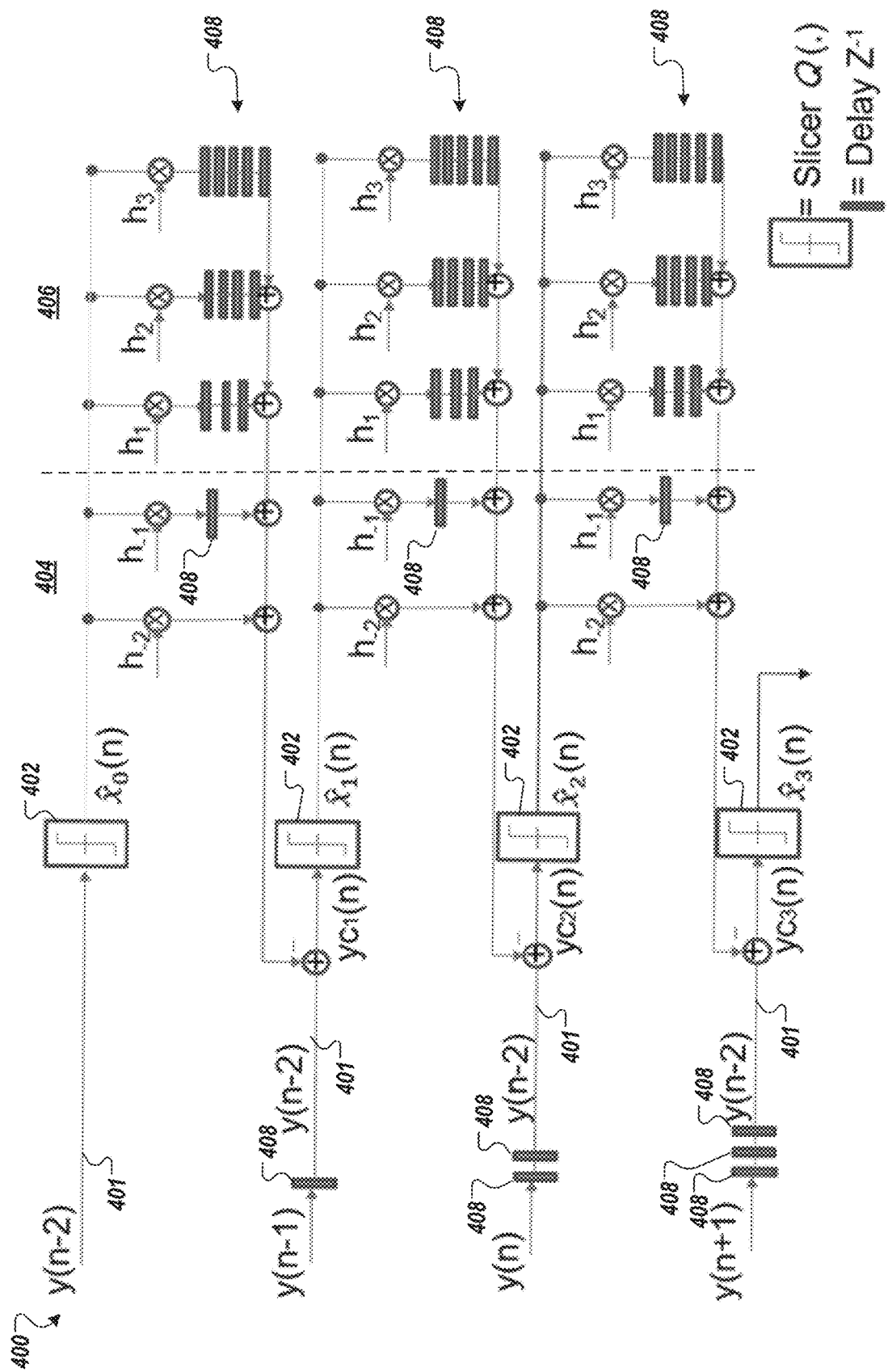
FIG. 4 is a block diagram of a DFFE system with two pre-cursor taps and three post-cursor taps for DFFE cancelation and four iterations for a non-partial response system (PR0), according to at least one embodiment.
Figure 5:
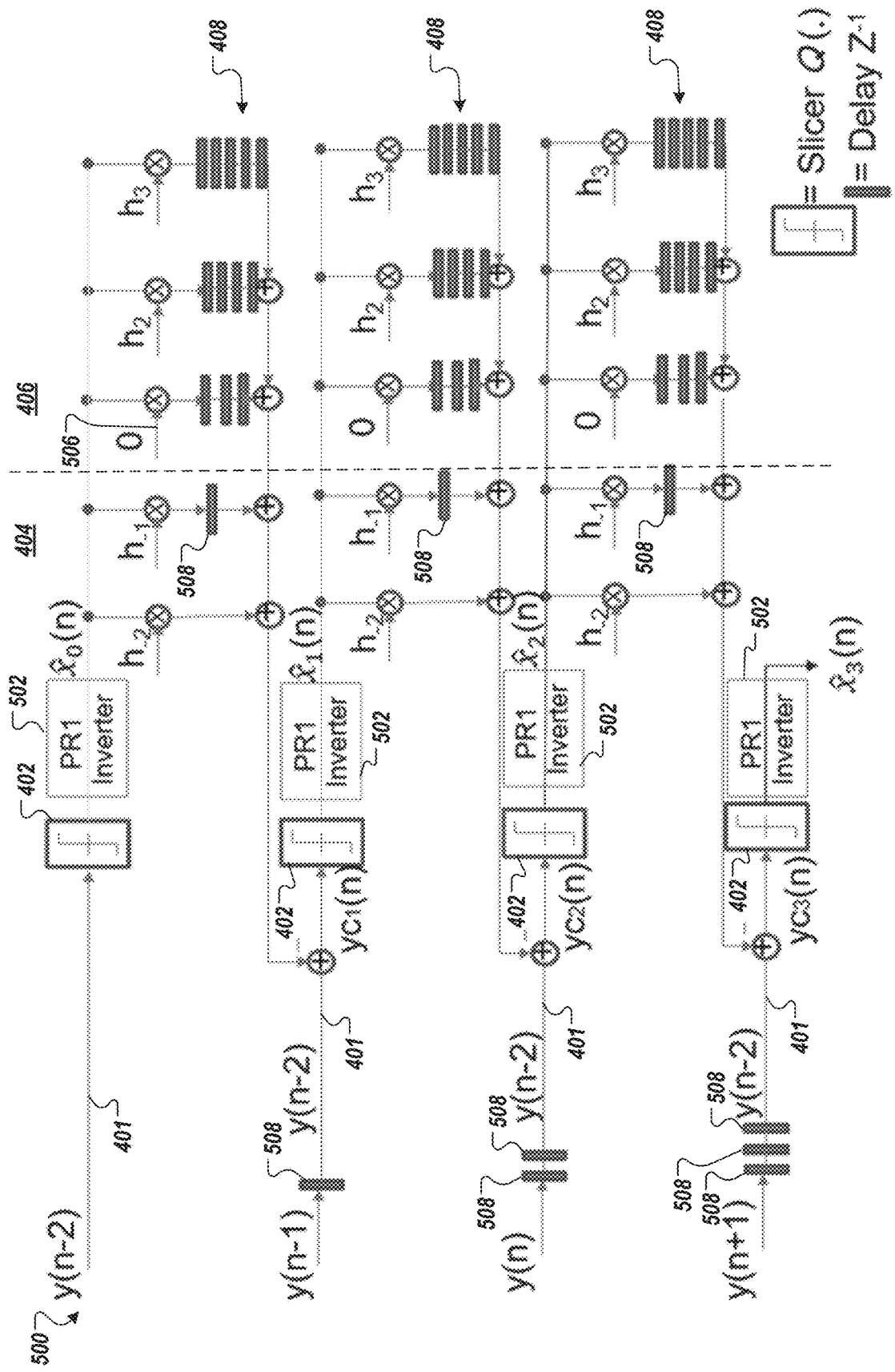
FIG. 5 is a block diagram of a DFFE system with two pre-cursor taps and three post-cursor taps for DFFE cancelation and four iterations for a partial response system (PR1) and a single post-cursor tap being zeroed, according to at least one embodiment.

FIG. 4 is a block diagram of a DFFE system 400 with two pre-cursor taps and three post-cursor taps for DFFE cancelation and four iterations for a non-partial response system (PR0), according to at least one embodiment. The DFFE system 400 includes a digital filter structure with four iterations of a slicer 402 (e.g., Q(.)), a set of pre-cursor taps 404, a set of post-cursor taps 406, and multiple delay elements 408 (e.g., $Z^{-1}$). In general, a multi-tap digital filter structure includes a series of filter taps. In at least one embodiment, the series of filter taps of the multi-tap digital filter structure includes a set of "pre-cursor" taps, a set of "post-cursor" taps, and a main tap. The multi-tap FFE digital filter structure can have any number of post-cursor taps and any number of pre-cursor taps. In at least one embodiment, each filter tap can be a two-input multiplier circuit configured to receive a digital signal and a filter tap weight or coefficient as inputs and multiply those values to generate a filter tap output. The multi-tap digital filter structure can include a summation component to sum the respective outputs of the filter taps to generate an output.

As illustrated, $h_{-1}$ and $h_{-2}$ denote the first and second pre-cursor ISI estimates and $h_1, \ldots, h_3$ denote the first three post cursor ISI estimates. In practice, the pre- and post-cursor ISI estimates are obtained through adaptive filters. FIG. 4 illustrates how to cancel both pre- and post-cursor ISI using an iterative DFFE scheme with the set of pre-cursor taps 404 and the set of post-cursor taps 406. To maintain causality and to handle post-cursor cancelation, the input sample stream 401 needs to be delayed by 2 unit intervals to handle two pre-cursor ISI cancelations. For example, in a traditional DFFE, the sample y(n) is processed without delay, and here in FIG. 4, y(n) is processed after a delay of 2 unit intervals (i.e., y(n−2)). Instead of feeding the sample y(n) different iterations in a traditional DFFE, the samples y(n−2) are used to feed into the different iterations to maintain the causality account for the first two pre-cursor cancelations. Pre-cursor processing requires looking ahead of samples in time, which is not possible in a causal system. To maintain causality, the delayed input samples y(n−2) will have to be used.

With a PAM4 PR1 partial response system, such as illustrated in FIG. 3, the sample y(n) can be the detected signal at the output 307 at the output of the digital RXFFE component 310. The detected signal includes impairments in the system, including ISI, noise, cross talk, etc. So, the decision estimates of the impaired partial response signal y(n) at the at the output 307 of the digital RXFFE component 310 can be the partial response symbol values y(n). For PAM4 transmitted symbols of −3, −1, 1, 3, the partial response symbols y (n) take on values of −6, −4, −2, 0, 2, 4, 6. The input samples x(n) denote the PAM4 transmitted symbols of −3, −1, 1, 3 and output samples $\hat{x}_i(n)$ are the decision estimates of those symbols at iteration/stage i of the DFFE system 308. As described above, a partial response system equalizes the received signal such that there is a carefully controlled and apriori determined relationship between consecutive values of equalized received symbols and the transmitted data. The DFFE system 308 applies DFFE to a partial response system to cancel both pre-cursor and post-cursor equalization using the digital filter structure of FIG. 4. The DFFE system 308 can perform a partial response inversion in order to apply DFFE on partial response signals as the ISI was originally introduced by the communication channel on the data symbols prior to equalization. The DFFE system 308 receives the output 307 and output 309. The DFFE system 308 cancels the pre-cursor IS and the post-cursor IS from the set of estimated transmitted symbol values to obtain a compensated signal (also referred to as a cleaned signal) and a set of compensated symbol values. Referring back to FIG. 4, in at least one embodiment, a partial response inverter can be added at the output of the slicers 402 to perform the partial response inversion.

In at least one embodiment, DFFE system 308 includes a subtractor to receive a summation of the pre-cursor ISI and the post-cursor ISI and the detected signal to obtain the compensated signal. The DFFE system 308 includes a second PR inverter to receive the compensated signal and generate the set of compensated symbol values. FIG. 5 is a block diagram of a DFFE system 500 with two pre-cursor taps and three post-cursor taps for DFFE cancelation and four iterations for a partial response system (PR1) and a single post-cursor tap being zeroed, according to at least one embodiment. The DFFE system 500 is similar to the DFFE system 400 of FIG. 4, except for the partial response inverters 502 and the single post-cursor tap 506 being zeroed. The partial response system can be a duobinary partial response system (also referred to as 1+D or PR1 system). As the ISI that needs to be canceled is introduced on transmitted data symbols x(n) by a communication channel (not illustrated in FIG. 5), the partial response symbol estimates $\hat{y}(n)$ need to be inverted, by partial response inverters 502, to the transmitted PAM4 symbol estimates $\hat{x}_i(n)$ prior to calculating the amount of ISI that needs to be canceled from the RXFFE samples y(n) after proper delays, as shown in FIG. 5.

It should be noted that the embodiments illustrated in FIGS. 4-5 provide a high-level conceptual diagram of the disclosed DFFE scheme. The aspects of these embodiments can be extended to any number and locations of pre-cursor ISI and post-cursor ISI that need to be canceled. For example, one can select a top 12 significant post-cursor ISI locations based on the top 12 magnitudes of the post-cursor estimates from respective adaptive filters. The same can be employed for the choice of pre-cursor cancelation locations if desired. As illustrated in FIG. 5, the first post-cursor ISI location is zeroed so that the ISI at this post-cursor tap is not canceled, whereas the other post-cursor ISI locations are canceled by the corresponding post-cursor taps.

In at least one embodiment, the digital filter structure includes a set of one or more pre-cursor taps to be used to cancel pre-cursor ISI. One or more of the set of pre-cursor taps can be zeroed so that the corresponding pre-cursor tap is not canceled. In at least one embodiment, the digital filter structure includes a set of one or more post-cursor taps to be used to cancel post-cursor ISI. One or more of the set of post-cursor taps can be zeroed so that the corresponding post-cursor tap is not canceled. In at least one embodiment, the digital filter structure includes a first set of one or more pre-cursor taps and a second set of one or more post-cursor taps to cancel both pre and post-cursor ISI. One or more of the pre- or post-cursor taps can be zeroed so that the corresponding tap is not canceled.

Figure 6:
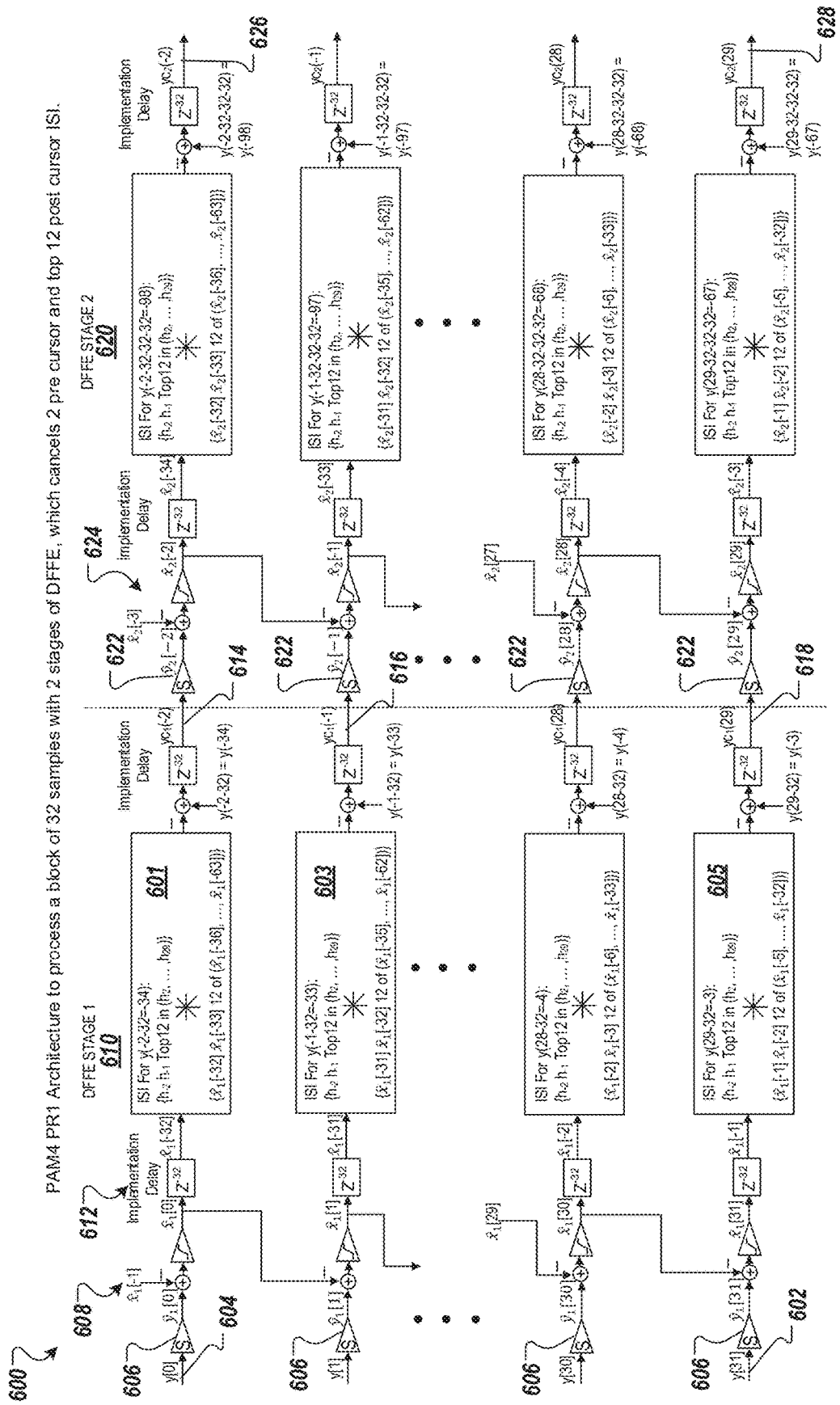
FIG. 6 is a block diagram of a DFFE system with a partial response inverter with two pre-cursor taps and top twelve post-cursor taps for DFFE cancelation and two iterations, according to at least one embodiment.

In at least one embodiment, the receiver can be a DSP-based receiver that can process a block of multiple samples with multiple stages of DFFE that cancel pre-cursor ISI at N number of pre-cursor taps (e.g., two pre-cursor ISI) and post-cursor ISI at M number of post-cursor taps (e.g., top 12 post cursor ISI), such as illustrated in FIG. 6.

FIG. 6 is a block diagram of a DFFE system 600 with a partial response inverter with two pre-cursor taps and top twelve post-cursor taps for DFFE cancelation and two iterations, according to at least one embodiment. The DFFE system 600 illustrates a detailed view of the DFFE method in a digital implementation. In this digital implementation, the DFFE system 600 processes a block of 32 y(n) samples (y(0), . . . , y(31)) in a digital clock cycle, where y(31) 602 is the most recent and y(0) 604 is the oldest input in a block of data. The slicers 606 get PAM4 PR1 symbol (−6,−4,−2, 0,2,4,6) estimates $\hat{y}_1(0), \ldots \hat{y}_1(31)$, which after PR1 inversion 608 produces PAM4 symbol (−3,−1,1,3) estimates $\hat{x}_1(0), \ldots \hat{x}_1(31)$ at a first DFFE stage 610 (labeled DFFE stage 1) as indicated in the subscript. To manage circuit timing constraints, a cycle delay 612 (32 Unit Intervals) may be introduced as denoted by $z^{-32}$. The PAM4 symbol estimates $\hat{x}_1(0), \ldots \hat{x}_1(31)$, become $\hat{x}_1(-32), \ldots \hat{x}_1(-1)$ after the cycle delay 612, which will be used in ISI computation. In this illustration, $h_{-1}$ and $h_{-2}$ are the estimates of pre-cursor ISI that need to be canceled. For the post cursor ISI cancelation, a top 12 significant post-cursor ISI locations based on the top 12 magnitudes of post-cursor estimates from respective adaptive filters are used. This is denoted by "TOP12 in $\{h_2$ and $h_{29}\}$". Note that the search space for ISI location is limited to 32 to match up with a digital clock cycle and other variants are possible in this implementation. The search space can be extended beyond 32 by increasing receiver complexity. In some embodiments, the first post-cursor tap $h_1$ is not part of ISI cancelation to produce a cleaned version of PAM4 PR1 samples denoted by $yc_1(n)$ at this DFFE stage number 1 as indicated by the subscript. To produce $yc_i(-2)$ 614, for example, the ISI estimate is obtained by convolving $\{h_{-2}, h_{-1}, \text{Top12 in } (h_2, \ldots, h_{29})$ with $\{\hat{x}_1(-32), \hat{x}_1(-33)$ and corresponding 12 of $\hat{x}_1(-36), \ldots, \hat{x}_1(-63)\}$ at block 601 and then subtracting the estimated ISI from y(−2−32)=y(−34). Similarly, to produce $yc_i(-1)$ 616, the ISI estimate is obtained by convolving $\{h_{-2}, h_{-1}, \text{Top12 in } (h_2, \ldots, h_{29})$ with $\{\hat{x}_1(-31), \hat{x}_1(-32)$ and corresponding 12 of $\hat{x}_1(-35), \ldots, \hat{x}_1(-62)\}$ at block 603 and then subtracting the estimated ISI from y(−1−32)=y(−33). And so on and so forth to finally produce $yc_1(29)$ 618, by convolving $\{h_{-2}, h_{-1}, \text{Top12 in } (h_2, \ldots, h_{29})$ with $\{\hat{x}_1(-1), \hat{x}_1(-2)$ and corresponding 12 of $\hat{x}_1(-5), \ldots, \hat{x}_1(-32)\}$ at block 605 to get the ISI estimate and then subtracting the estimated ISI from y(29−32)=y(−3). Thus, at the end of stage 1, the input PAM4 PR1 samples y(0), . . . , y(31) will be cleaned up after ISI cancelation to produce cleaned PAM4 PR1 samples $yc_1(-2), \ldots, yc_1(29)$. The shift in index 2 is to maintain causality because of the two pre-cursor taps used. The cleaned-up PAM4 PR1 samples from stage 1, $yc_1(-2), \ldots, yc_1(29)$, become input to a second DFFE stage 620 (labeled DFFE Stage 2). These samples are sliced by slicers 622 to produce (supposed to be better) estimates of PAM4 PR1 symbol estimates $\hat{y}_2(0), \ldots, \hat{y}_2(31)$ in the second DFFE stage 620. Those PAM4 PR1 symbol estimates after PR1 inversion 624 produces PAM4 symbol estimates $\hat{x}_2(0), \ldots, \hat{x}_2(31)$, which are used in ISI estimation at DFFE stage number 2. After subtracting the estimated second stage ISI from the original samples y(n) after proper delay, further cleaned up PAM4 PR1 samples, $yc_2(-2), \ldots, yc_2(29)$ 626-628, are produced at the output of DFFE stage 2 similarly as decried above with respect to the first DFFE stage 610. Similarly, more than two DFFE stages can be cascaded. In at least one embodiment, the blocks 601, 603, 605 are N ISI calculators, each of the N number of ISI calculators to compute an ISI value based on a sequence of the estimated transmitted symbol values and a top P number of pre-cursor tap coefficients and a top M number of post-cursor tap coefficients. In another embodiment, a first DFFE stage of the digital filter structure includes N number of PR inverters, N number of ISI calculators, and N number of subtractors. The N number of PR inverters receive the detected signal and to generate N number of transmitted symbol values. Each of the N number of ISI calculators computes an ISI value based on a sequence of the estimated transmitted symbol values and a top P number of pre-cursor tap coefficients and a top M number of post-cursor coefficients. Each of the N number of subtractors to subtract the respective ISI value from the detected signal to obtain N number of compensated signals. In another embodiment, the digital filter structure processes a block of N number of the detected symbol values with at least one DFFE stage to cancel at least one of a top P number of pre-cursor taps or a top M number of post-cursor taps, where N, M, and P are integers that are equal to zero or greater. In a further embodiment, a second DFFE stage of the digital filter structure receives the N number of compensated signals from the first DFFE stage and uses at least one of the estimated transmitted symbol values generated in the first DFFE stage.

Figure 7:
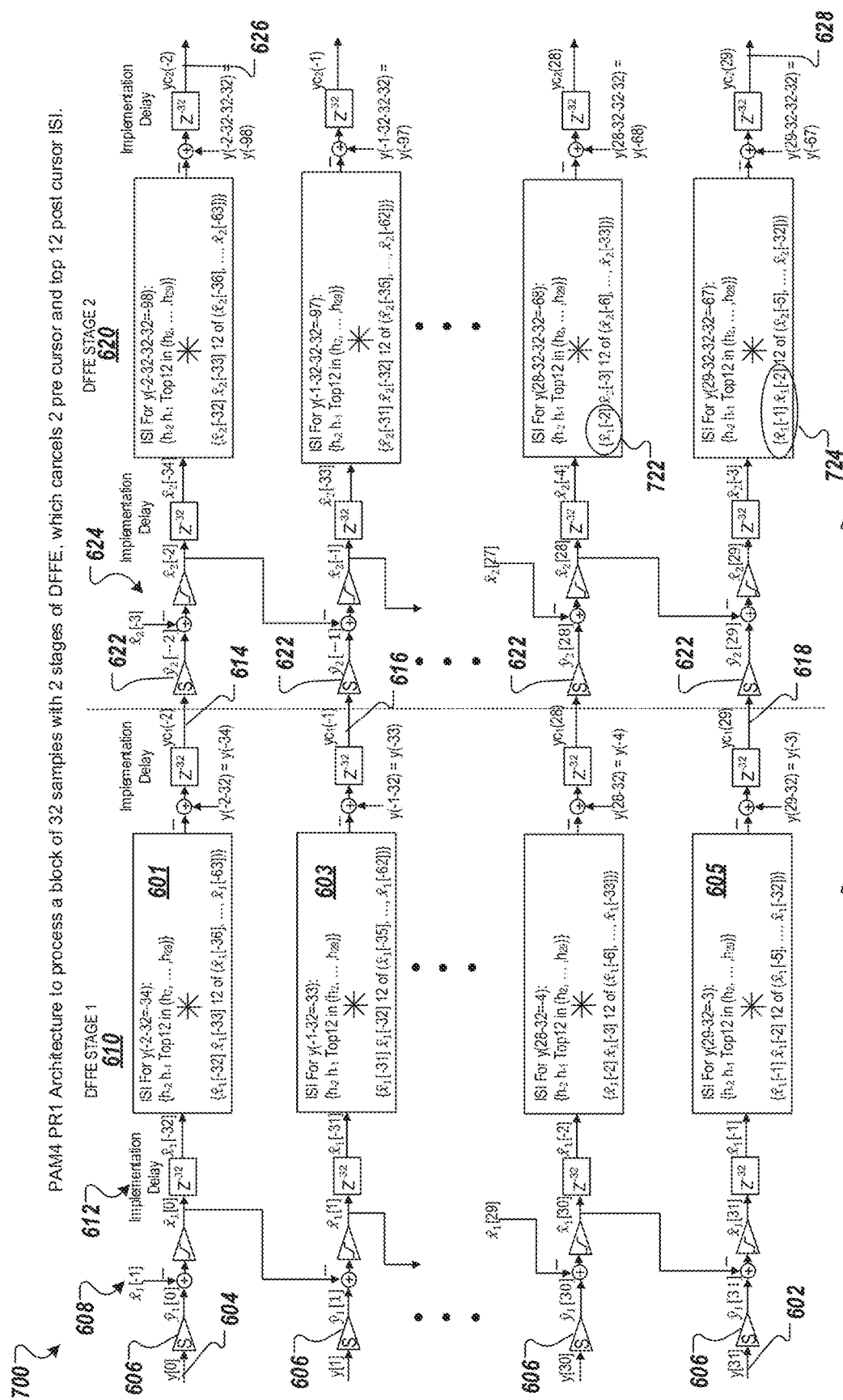
FIG. 7 is a block diagram of a DFFE system with a partial response inverter with two pre-cursor taps and top twelve post-cursor taps for DFFE cancelation, two iterations, and simplified pre-cursor cancelation, according to at least one embodiment.

One practical problem faced with this implementation in FIG. 6 is the usage of $\hat{x}_2(-2)$ in the computation of cleaned sample $yc_2(28)$ and usage of $\hat{x}_2(-1)$ and $\hat{x}_2(-2)$ in the computation of cleaned sample $yc_2(29)$. $\hat{x}_2(-1)$ and $\hat{x}_2(-2)$ are not available for use in the second DFFE stage 620 as only $\hat{x}_2(-3)$ through $\hat{x}_2(-34)$ are available. To obtain $\hat{x}_2(-1)$ and $\hat{x}_2(-2)$ more processing, handling more than 32 samples in a 32 unit interval clock is needed, which increases circuit complexity. It can be shown that to have all necessary $\hat{x}_i(n)$ to be included in all pre-cursor cancelation in each DFFE stage i, the product of the number of pre-cursors and the number of DFFE stages worth of samples y(n) in addition to the 32 samples (y(0), . . . , y(31)) need to be processed (sliced and inverted to get PAM4 symbol estimates) in the first DFFE stage 610. In FIG. 6, to have $\hat{x}_2(-1)$ and $\hat{x}_2(-2)$ in the second DFFE stage 620, the first DFFE stage 610 should have processed y(33) and y(34) in addition to processing y(0), . . . , y(31) in the same clock cycle, which can be challenging to meet digital timing requirements. A subsequent DFFE stage can use samples from a previous DFFE stage instead of computing the samples in at least one embodiment, such as illustrated in FIG. 7. In at least one embodiment, the second DFFE stage of the digital filter structure uses at least one of the estimated transmitted symbol values computed in the first DFFE stage.

FIG. 7 is a block diagram of a DFFE system 700 with a partial response inverter with two pre-cursor taps and top twelve post-cursor taps for DFFE cancelation, two iterations, and simplified pre-cursor cancelation, according to at least one embodiment. The DFFE system 700 is similar to DFFE system 600 except, instead of using $\hat{x}_2(-1)$ and $\hat{x}_2(-2)$ in the second DFFE stage 620, the estimates from DFFE stage 1, i.e. $\hat{x}_1(-1)$ and $\hat{x}_1(-2)$ are used in $yc_2(28)$ and $yc_2(29)$ 722-724. This means that pre-cursor cancelation is fully done only for the first DFFE stage 610, and the rest of the DFFE stages will benefit from the cleaned-up post cursors only. This still provides enough benefit to the DFFE scheme as the majority of performance improvement comes from the first DFFE stage 610 and still provides the benefit of reducing the number of DFFE stages needed to achieve a target performance. In at least one embodiment, the second DFFE stage 620 uses at least one of the estimated transmitted symbol values generated in the first DFFE stage 610.

Although various embodiments describe a DFFE system for a PR1 system, in other embodiments, the DFFE system can be used in other partial response systems. Also, other digital implementations are possible other than those illustrated in FIGS. 6-7.

Figure 8:
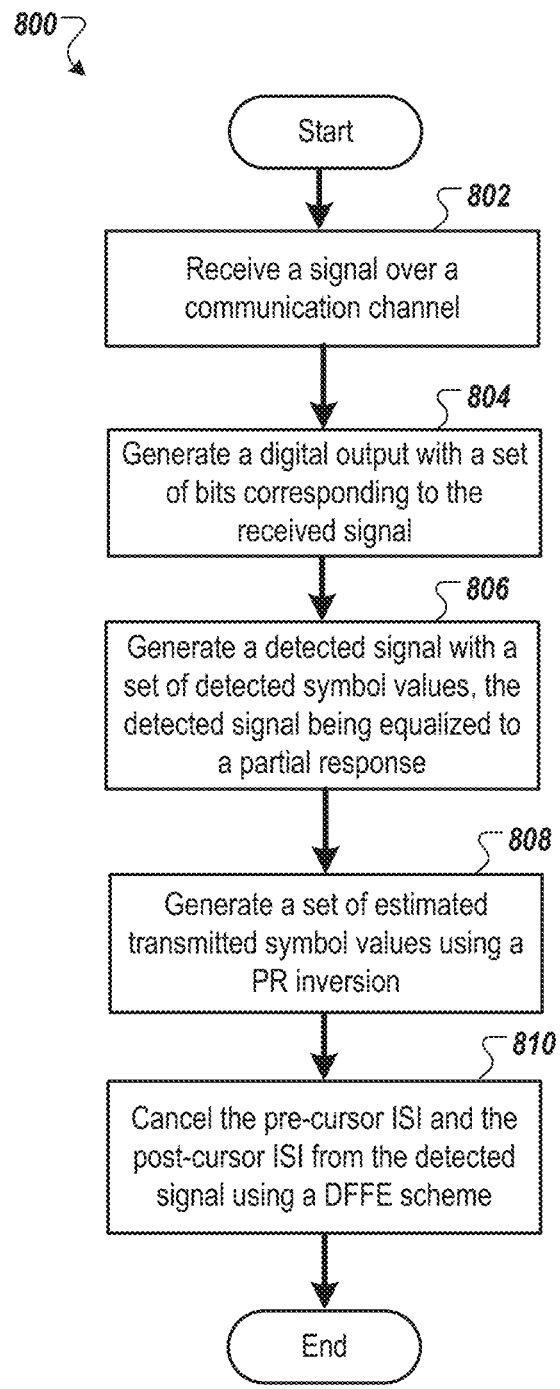
FIG. 8 is a flow diagram of a method of DFFE circuitry for partial response equalized signals and pre-cursor ISI cancelation, according to at least one embodiment.

FIG. 8 is a flow diagram of a method 800 of DFFE circuitry for partial response equalized signals and pre-cursor ISI cancelation, according to at least one embodiment. The method 800 can be performed by processing logic comprising hardware, software, firmware, or any combination thereof. In at least one embodiment, the method 800 is performed by receiver 104 of FIG. 1B. In at least one embodiment, the method 800 is performed by DFFE circuitry 108 of FIG. 1B, DFFE system 308 of FIG. 3, or the other DFFE system described above with respect to FIGS. 4-7.

Referring to FIG. 8, the method 800 begins with the processing logic receiving a signal over a communication channel (block 802). The processing logic generates a digital output comprising a set of bits corresponding to the received signal (block 804). The digital output comprises pre-cursor ISI and post-cursor ISI introduced by a communication channel. The processing logic generates a detected signal comprising a set of detected symbol values (block 806). The detected signal is equalized to a partial response and based on the digital output. The processing logic generates a set of estimated transmitted symbol values based on the set of detected symbol values using a PR inversion (block 808). The processing logic cancels the pre-cursor ISI and the post-cursor ISI from the detected signal using a decision feed forward equalization (DFFE) scheme with the set of estimated transmitted symbol values and a set of tap coefficients to obtain a compensated signal and a set of compensated symbol values (block 810), and the method 800 ends.

In at least one embodiment, the processing logic generates an error metric and adjusts a sampling phase associated with the received signal based on the set of detected symbol values and the error metric.

In at least one embodiment, the processing logic sets at least one post-cursor tap coefficient of the DFFE to zero such that the post-cursor ISI from at least one post-cursor tap is not canceled.

In another embodiment, the processing logic cancels the pre-cursor ISI and the post-cursor ISI from the detected signal at block 810 by computing an ISI value based on the set of the estimated transmitted symbol values and a top P number of pre-cursor tap coefficients and a top M number of post-cursor coefficients and subtracting the respective ISI value from the detected signal to obtain the compensated signal. M and P are integers that are equal to zero or greater.

Figure 9:
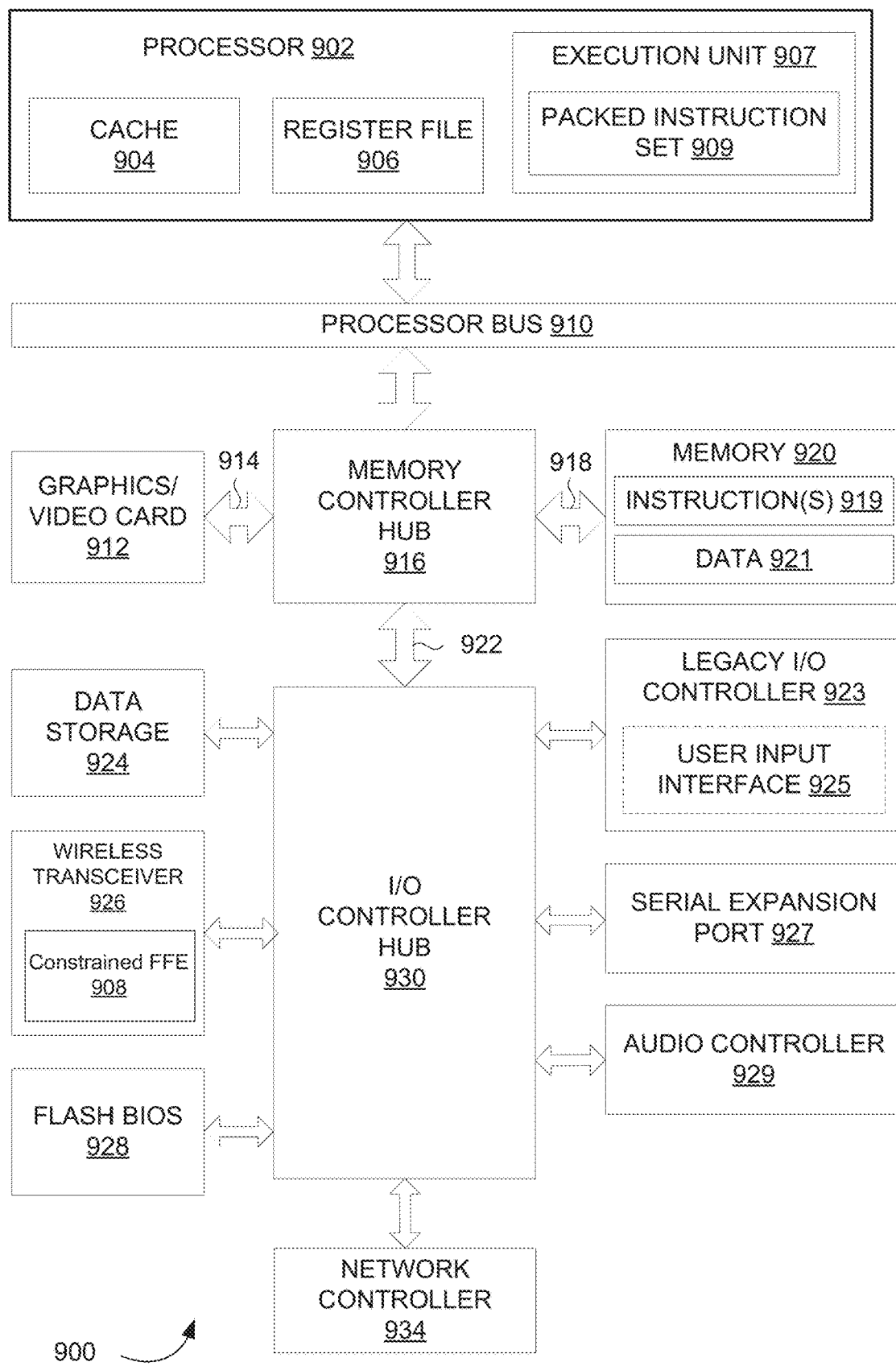
FIG. 9 illustrates an example computer system including a wireless transceiver including a constrained feed forward equalizer, in accordance with at least some embodiments.

FIG. 9 illustrates a computer system 900, in accordance with at least one embodiment. In at least one embodiment, computer system 900 may be a system with interconnected devices and components, an SOC, or some combination. In at least on embodiment, computer system 900 is formed with a processor 902 that may include execution units to execute an instruction. In at least one embodiment, computer system 900 may include, without limitation, a component, such as processor 902 to employ execution units including logic to perform algorithms for processing data. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 900 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 900 may be used in devices such as graphics processing units (GPUs), network adapters, central processing units and network devices such as switch (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 900 may include, without limitation, processor 902 that may include, without limitation, one or more execution units 907 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 900 is a single processor desktop or server system. In at least one embodiment, computer system 900 may be a multiprocessor system. In at least one embodiment, processor 902 may include, without limitation, a CISC microprocessor, a RISC microprocessor, a VLIW microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. In at least one embodiment, processor 902 may also include a combination of both internal and external caches. In at least one embodiment, a register file 906 may store different types of data in various registers including, without limitation, integer registers, floating point registers, status registers, and instruction pointer register.

In at least one embodiment, execution unit 907, including, without limitation, logic to perform integer and floating point operations, also resides in processor 902. Processor 902 may also include a microcode ("ucode") read only memory ("ROM") that stores microcode for certain macro instructions. In at least one embodiment, execution unit 907 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a DRAM device, an SRAM device, flash memory device, or other memory device. Memory 920 may store instruction(s) 919 and/or data 921 represented by data signals that may be executed by processor 902.

In at least one embodiment, a system logic chip may be coupled to processor bus 910 and memory 920. In at least one embodiment, the system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data, and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, a chipset, and processor 902. Examples may include, without limitation, an audio controller 929, a firmware hub ("flash BIOS") 928, a wireless transceiver 926, a data storage 924, a legacy I/O controller 923 containing a user input interface 925 and a keyboard interface, a serial expansion port 927, such as a USB, and a network controller 934. Data storage 924 may comprise a hard disk drive, a floppy disk drive, a CD-ROM device, a flash memory device, or other mass storage device. In an embodiment, the wireless transceiver 926 includes a DFFE system as described herein.

In at least one embodiment, FIG. 9 illustrates a system, which includes interconnected hardware devices or "chips." In at least one embodiment, FIG. 9 may illustrate an exemplary SoC. In at least one embodiment, devices illustrated in FIG. 9 may be interconnected with proprietary interconnects, standardized interconnects (e.g., PCIe), or some combination thereof. In at least one embodiment, one or more components of system 900 are interconnected using compute express link ("CXL") interconnects.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a network device or a MACsec device. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously, or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A receiver comprising:
a partial response (PR) system to receive a received signal from a transmitter over a channel and equalize the received signal such that there is a controlled relationship between consecutive values of equalized received symbols and transmitted data transmitted by the transmitter; and
a decision feed forward equalization (DFFE) system to receive partial response signals from the PR system and cancel at least one of pre-cursor intersymbol interference (ISI) or post-cursor ISI introduced by the channel.

2. The receiver of claim 1, wherein the DFFE system comprises a digital filter structure comprising:
a PR inverter stage to perform a partial response inversion on the partial response signals;
a set of pre-cursor taps;
a set of post-cursor taps; and
a set of delay elements.

3. The receiver of claim 2, wherein the set of pre-cursor taps comprises two pre-cursor taps, and wherein the set of post-cursor taps comprises two or more post-cursor taps.

4. The receiver of claim 3, wherein at least one of the two or more post-cursor taps is set to zero.

5. The receiver of claim 1, wherein the DFFE system comprises a digital filter structure comprising:
a PR inverter stage to perform a partial response inversion on the partial response signals; and
a set of one or more pre-cursor taps.

6. The receiver of claim 1, wherein the DFFE system comprises a digital filter structure comprising:
a PR inverter stage to perform a partial response inversion on the partial response signals; and
a set of one or more post-cursor taps.

7. The receiver of claim 1, further comprising an analog-to-digital converter (ADC) coupled to the PR system, the ADC to generate a digital output comprising a set of bits corresponding to the received signal, wherein the digital output comprises the at least one of pre-cursor ISI or post-cursor ISI introduced by the channel.

8. A system comprising:
a transmitter; and
a receiver communicatively coupled to the transmitter via a communication channel, wherein the receiver comprises:
a partial response (PR) system to receive a received signal from a transmitter over a channel and equalize the received signal such that there is a controlled relationship between consecutive values of equalized received symbols and transmitted data transmitted by the transmitter; and
a decision feed forward equalization (DFFE) system to receive partial response signals from the PR system and cancel at least one of pre-cursor intersymbol interference (ISI) or post-cursor ISI introduced by the channel.

9. The system of claim 8, wherein the DFFE system comprises a digital filter structure comprising:
a PR inverter stage to perform a partial response inversion on the partial response signals;
a set of pre-cursor taps;
a set of post-cursor taps; and
a set of delay elements.

10. The system of claim 9, wherein the set of pre-cursor taps comprises two pre-cursor taps, and wherein the set of post-cursor taps comprises two or more post-cursor taps.

11. The system of claim 10, wherein at least one of the two or more post-cursor taps is set to zero.

12. The system of claim 8, wherein the DFFE system comprises a digital filter structure comprising:
   a PR inverter stage to perform a partial response inversion on the partial response signals; and
   a set of one or more pre-cursor taps.

13. The system of claim 8, wherein the DFFE system comprises a digital filter structure comprising:
   a PR inverter stage to perform a partial response inversion on the partial response signals; and
   a set of one or more post-cursor taps.

14. The system of claim 8, further comprising an analog-to-digital converter (ADC) coupled to the PR system, the ADC to generate a digital output comprising a set of bits corresponding to the received signal, wherein the digital output comprises the at least one of pre-cursor ISI or post-cursor ISI introduced by the channel.

15. A method of a receiver, the method comprising:
   receiving, by a partial response (PR) system, a received signal from a transmitter over a channel;
   equalizing, by the PR system, the received signal to obtain partial response signals such that there is a controlled relationship between consecutive values of equalized received symbols and transmitted data transmitted by the transmitter; and
   canceling, by a decision feed forward equalization (DFFE) system, at least one of pre-cursor intersymbol interference (ISI) or post-cursor ISI introduced by the channel.

16. The method of claim 15, wherein the DFFE system comprises a digital filter structure comprising:
   a PR inverter stage to perform a partial response inversion on the partial response signals;
   a set of pre-cursor taps;
   a set of post-cursor taps; and
   a set of delay elements.

17. The method of claim 16, wherein the set of pre-cursor taps comprises two pre-cursor taps, and wherein the set of post-cursor taps comprises two or more post-cursor taps.

18. The method of claim 17, wherein at least one of the two or more post-cursor taps is set to zero.

19. The method of claim 15, wherein the DFFE system comprises a digital filter structure comprising:
   a PR inverter stage to perform a partial response inversion on the partial response signals; and
   a set of one or more pre-cursor taps.

20. The method of claim 15, wherein the DFFE system comprises a digital filter structure comprising:
   a PR inverter stage to perform a partial response inversion on the partial response signals; and
   a set of one or more post-cursor taps.

* * * * *